Patented Oct. 28, 1941

2,261,085

UNITED STATES PATENT OFFICE 2,261,085

UREA - FORMALDEHYDE - ACID - AMINE CO-CONDENSATION PRODUCTS AND PROCESS OF MAKING THE SAME

Almon G. Hovey, Birmingham, and Theodore S. Hodgins, Royal Oak, Mich., assignors to Reichhold Chemicals, Inc., formerly Beck, Koller & Company, Inc., Detroit, Mich.

No Drawing. Application March 19, 1941, Serial No. 384,134

11 Claims. (Cl. 260—42)

The invention relates to co-condensation products formed by reacting urea, formaldehyde, a polyfunctional organic acid and an organic amine, and to the process of making the same, wherein the reaction takes place in the presence of a solvent. The present application is a continuation-in-part of our prior application Serial No. 247,988 filed December 27, 1938.

We have in our Patent No. 2,109,291 dated February 22, 1938, described the preparation of certain modified urea-formaldehyde condensation products suitable as coating compositions, and in our applications Serial Nos. 203,149 filed April 20, 1938, and 237,578 filed October 28, 1938, now Patents Nos. 2,221,708 and 2,226,518, we have described certain modified dimethylolurea and urea-formaldehyde products and processes for making the same, which products are adapted for use in the preparation of the co-condensation products herein set forth.

As set forth in various of our prior patents referred to in our application Serial No. 247,988, useful resins may be formed by reacting various polyfunctional organic acids with organic amines, particularly the organic mono-amines. In our application Serial No. 247,988 we have shown that a further reaction takes place when said polyfunctional organic acids and organic amines are condensed with urea and formaldehyde or with reaction products of the urea-formaldehyde type, such as dimethylolurea and solvent modified urea-formaldehyde products. The present application is concerned principally with the less mentioned reaction products and the process of producing the same.

The solvent employed may be either active or inactive, but a chemically reactive solvent, such as a monohydric or polyhydric alcohol as was described in our original application Serial No. 237,578, is preferred. The condensation may be carried out in one or more stages as set forth in our application Serial No. 247,988 but preferably a preformed solvent modified urea-formaldehyde resin is reacted with a resin formed by reacting a polyfunctional organic acid with an organic amine.

The invention will be more readily understood by reference to the accompanying specific examples which are intended as illustrative only and not as limiting the invention to the particular details set forth therein.

Example 1

(a) One mol of benzoylbenzoic acid was reacted with one mol of isobutylamine for 30 minutes from 100–190° C., yielding a pale straw colored resinous product having a cure of 29 seconds on the hot plate at 200° C. This resin was insoluble in water, acetone, toluol and mineral spirits, but soluble in alcohol.

(b) 50 parts by weight of the product described in (a) was reacted with 84 grams of a urea-formaldehyde-butanol resin for one hour at 120–130° C. producing a pale straw colored resinous product having a cure of 8 seconds on the hot plate at 200° C. The resulting resin was insoluble in water and mineral spirits, but soluble in acetone, alcohol and toluol. This product because of its pale light color and fast heat-hardening characteristics may be used for producing hard colorless enamels.

Example 2

(a) One mol of adipic acid was reacted with one mol of dioctylamine at 136–270° C. for 30 minutes. The resulting water-white resin had a cure of 25 seconds on the 200° C. hot plate. This product was insoluble in water, and soluble in acetone, alcohol and toluol, and to a limited extent in mineral spirits.

(b) 50 parts by weight of the resin described in (a) was reacted with 84 parts of a urea-formaldehyde-butanol resin for one hour at 120–130° C. The resulting pale straw to water-white product had a cure of 27 seconds on the hot plate at 200° C. The resin was insoluble in water, but soluble in acetone, alcohol, toluol and mineral spirits.

We claim:

1. A process which comprises heat reacting an alcohol modified urea-formaldehyde resin with the resin formed from a polyfunctional carboxylic acid and an organic mono-amine, said urea-formaldehyde resin and acid-amine resin constituting the principal reacting ingredients.

2. A resinous product formed by heat reacting an alcohol modified urea-formaldehyde resin with the resin formed from a polyfunctional carboxylic acid and an organic mono-amine, said urea-formaldehyde resin and acid-amine resin constituting the principal reacting ingredients.

3. An artificial resin formed by heat reacting a butanol modified urea-formaldehyde condensation product with the resin formed from a polyfunctional carboxylic acid and an organic mono-amine, said urea-formaldehyde resin and acid-amine resin constituting the principal reacting ingredients.

4. An artificial resin suitable for use in coating compositions and the like formed by heat reacting a urea-formaldehyde-butanol resin with the resin derived from a polyfunctional carboxylic acid and an organic mono-amine, said urea-formaldehyde resin and acid-amine resin constituting the principal reacting ingredients.

5. A process as set forth in claim 1 wherein the acid-amine resin is formed by reacting equimolecular quantities of the acid and amine.

6. A resinous reaction product as set forth in claim 2 wherein the acid employed in the production of the acid-amine resin is benzoylbenzoic acid.

7. A resinous reaction product as set forth in claim 2 wherein the amine employed in the production of said acid-amine resin is isobutylamine.

8. A resinous reaction product as set forth in claim 2 wherein the acid-amine resin is derived from benzoylbenzoic acid and isobutylamine.

9. A resinous reaction product as set forth in claim 2 wherein the acid employed in the production of the acid-amine resin is adipic acid.

10. A resinous reaction product as set forth in claim 2 wherein the amine employed in the production of the acid-amine resin is dioctylamine.

11. A resinous reaction product as set forth in claim 2 wherein the acid-amine resin is derived from adipic acid and dioctylamine.

ALMON G. HOVEY.
THEODORE S. HODGINS.